(12) United States Patent
Tsutsumi et al.

(10) Patent No.: US 8,181,455 B2
(45) Date of Patent: May 22, 2012

(54) POWER GENERATING APPARATUS OF RENEWABLE ENERGY TYPE AND METHOD FOR INSTALLING HYDRAULIC PUMP

(75) Inventors: Kazuhisa Tsutsumi, Tokyo (JP); Taku Ichiryuu, Akashi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/176,221

(22) Filed: Jul. 5, 2011

(65) Prior Publication Data

US 2012/0047886 A1 Mar. 1, 2012

Related U.S. Application Data

(63) Continuation of application No. PCT/JP2011/058648, filed on Apr. 5, 2011.

(51) Int. Cl.
*F03D 9/00* (2006.01)
*F03D 11/02* (2006.01)
(52) U.S. Cl. .......................... 60/398; 403/298
(58) Field of Classification Search ............ 60/398; 403/298; 92/136
See application file for complete search history.

(56) References Cited

U.S. PATENT DOCUMENTS

| 7,418,820 B2 * | 9/2008 | Harvey et al. ............ 60/398 |
| 2005/0155346 A1 * | 7/2005 | Nikolaus ................. 60/398 |

FOREIGN PATENT DOCUMENTS

| JP | 2000-249162 | 9/2000 |
| JP | 2005-504228 | 2/2005 |
| JP | 2005-248738 | 9/2005 |
| JP | 2007-085476 | 4/2007 |
| JP | 2008-232206 | 10/2008 |

* cited by examiner

*Primary Examiner* — Thomas E Lazo
(74) *Attorney, Agent, or Firm* — Manabu Kanesaka; Kenneth M. Berner; Benjamin H. Hauptman

(57) ABSTRACT

It is intended to provide a power generating apparatus of renewable energy type that has a fixation structure of the hydraulic pump that can transmit large torque and can be processed with ease and at low cost even when the main shaft has a large diameter, as well as a method of installing such hydraulic pump. In the power generating apparatus, a connecting member 20 is provided on the outer periphery of a main shaft 4 to engage with a cylindrical member 10 provided on the outer periphery of the main shaft 4. The connecting member 20 includes a fixing part 21, a first spline part 22 and first pins 23. The fixing part 21 is fixed to the outer periphery of the main shaft 4 by means of the first pins 23 disposed along a circumferential direction of the main shaft 4. The first spline part 22 extending at other end of the fixing part 21 on a rear-end side, has a clearance S between the outer periphery of the main shaft 4 and the first spline part 22 and first spline teeth 24 formed on an inner periphery facing the clearance S. The clearance S opens at the end of the fixing part 21 on the rear-end side.

14 Claims, 9 Drawing Sheets

6: Hydraulic motor
7: Generator

A-A cross section

Fragmentary view from B

Fragmentary view from C

Enlarged view of D

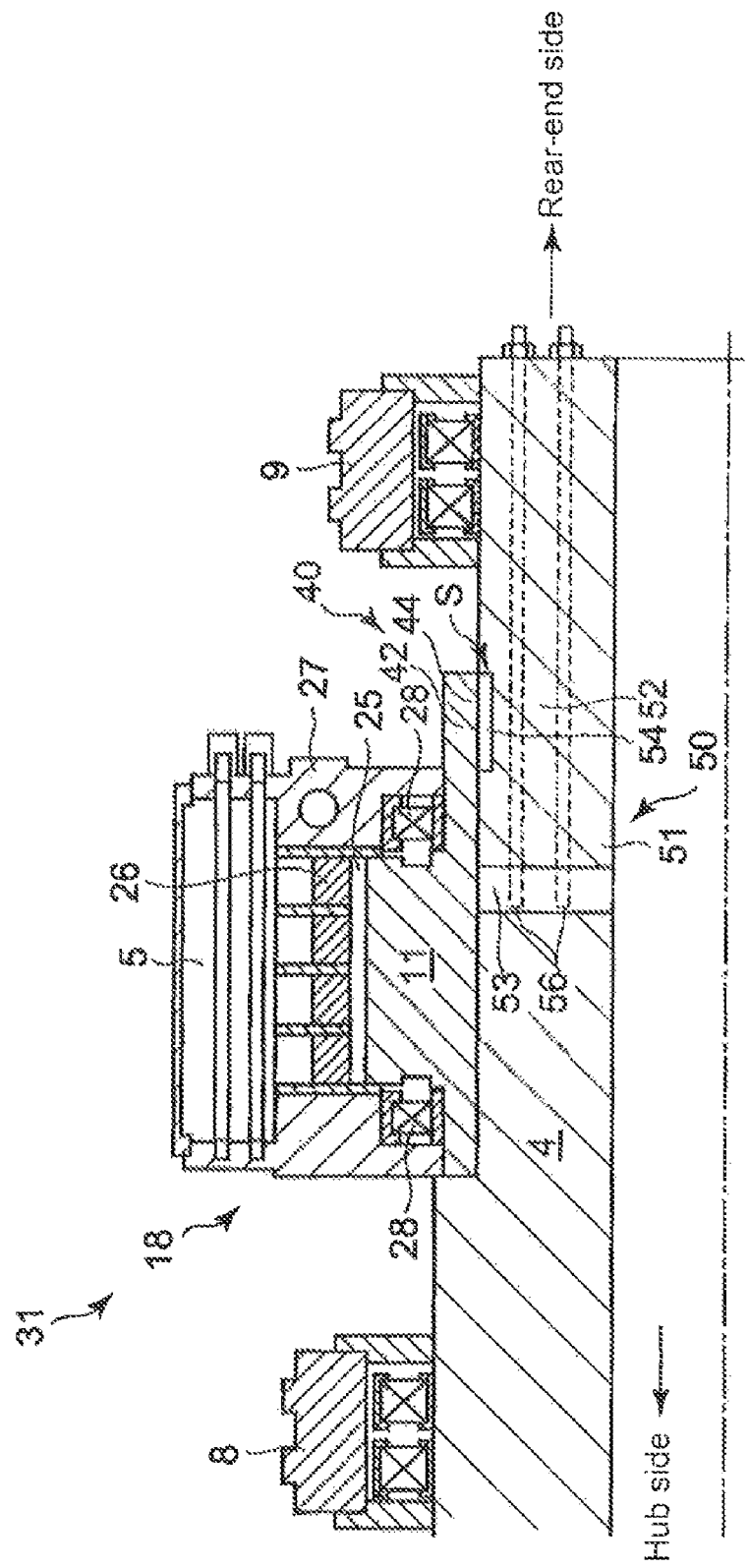

POWER GENERATING APPARATUS OF RENEWABLE ENERGY TYPE AND METHOD FOR INSTALLING HYDRAULIC PUMP

RELATED APPLICATIONS

The present application is continuation from PCT International Application of PCT/JP2011/058648 filed Apr. 5, 2011, the disclosure of which is hereby incorporated by reference herein in its entirety.

TECHNICAL FIELD

The present invention relates to a power generating apparatus of renewable energy type which transmits rotation energy of a rotor to a generator via a hydraulic transmission formed by a hydraulic pump and a hydraulic motor, and a method for installing the hydraulic pump. The power generating apparatus of reusable-energy type uses renewable energy such as wind, tidal current, ocean current and river current to generate power. There are, for instance, a wind turbine generating apparatus, a tidal current generating apparatus, an ocean current generating apparatus, a river current power generating apparatus and the like.

BACKGROUND ART

Recently, from the perspective of environmental protection, a wind power generating apparatus using wind power and other power generating apparatuses using renewable energy such as tidal current, ocean current and river current are becoming popular. In the power generating apparatus of renewable energy type, motion energy of wind, tidal current, ocean current or river current is converted to rotation energy of the rotor and the rotation energy is converted to electric power by a generator.

In such power generating apparatus of renewable energy type, the rotation speed of the rotor is low compared to a rated rotation speed of the generator and thus, a mechanical gearbox is provided between the rotor and the generator. Specifically, the rotation speed of the rotor is increased to the rated speed of the generator by the gearbox and then inputted to the generator.

To improve power generation, efficiency, the power generating apparatus of renewable energy type becomes larger and the gearbox becomes heavier and more expensive as well. In view of this, a power generating apparatus of renewable energy type which uses hydraulic transmission having a hydraulic pump and a hydraulic motor instead of the mechanical gearbox, receives increased attention.

For instance, disclosed in Patent Literatures 1 and 2 is a wind power generating apparatus equipped with a hydraulic transmission formed by a hydraulic installed around a main shaft and a hydraulic motor driven by pressurized oil of the hydraulic pump. In such wind power generating apparatus, the hydraulic pump is driven by the rotation of the main shaft and the hydraulic motor is driven by the pressurized oil supplied from the hydraulic pump so as to drive the generator by the rotation of the hydraulic motor.

CITATION LIST

Patent Literature

[PTL 1]
U.S. 2010/0032959
[PTL 2]
EP 2151574 (Application No. 09166576 A)

SUMMARY OF INVENTION

Technical Problem

In the wind turbine generator, torque of the main shaft is significantly large and it brings an issue about how to transmit the large torque from the main shaft to the hydraulic pump. A common method for transmitting large torque is to use spline. However, the main shaft of the wind turbine generator has a large diameter, e.g. approximately 1.5 m in diameter and it is difficult and expensive to spline the main shaft of large diameter.

In Patent Literatures 1 and 2, a fixation structure of the hydraulic pump to the main shaft is not disclosed in details and a solution to the above issue when the hydraulic transmission is used in the wind turbine generator is not proposed.

In power generating apparatuses of renewable energy type, other than the wind turbine generator, the above issue must be solved to use the hydraulic transmission.

It is an object of the present invention is to provide a power generating apparatus of renewable energy type that has a fixation structure of the hydraulic pump that can transmit large torque and can be processed with ease and at low cost even when the main shaft has a large diameter, as well as a method of installing such hydraulic pump.

Solution to Problem

In view of the issues above, an aspect of the present invention is a power generating apparatus of renewable energy type which may include, but is not limited to: a hub to which a blade is installed; a main shaft one end of which is coupled to the hub; a connecting member which has first spline teeth and is fixed to the main shaft, the connecting member being constituted of a separate body from the main shaft; a cylindrical member which has second spline teeth meshing with the first spline teeth of the connecting member and is provided around the main shaft; a hydraulic pump which is installed to the main shaft via the cylindrical member; a hydraulic motor which is driven by pressurized oil supplied from the hydraulic pump; and a generator which is coupled to the hydraulic motor. The cylindrical member and the main shaft may be connected with each other via the connecting member by meshing the first spline teeth of the connecting member with the second spline teeth of the cylindrical member.

According to the power generating apparatus of renewable energy type, the first spline teeth of the connecting member fixed to the main shaft, mesh with the second spline teeth of the cylindrical member to which the hydraulic pump is fixed. As a result, large torque can be transmitted from the main shaft to the hydraulic pump via connecting member and the cylindrical member.

The connecting member and the cylindrical member are constituted of separate bodies from the main shaft. Thus, even when the diameter of the main shaft is large, the connecting member and the cylindrical member can be spline-processed with ease and at low cost.

The connecting member may include, but is not limited to, a fixing part which is fixed to an outer periphery of the main shaft, and a first spline part which has a clearance between the outer periphery of the main shaft and the first spline part and is formed with the first spline teeth on an inner periphery facing the clearance.

The cylindrical member may include, but is not limited to, a second spline part which is formed with the second spline teeth on a part of an outer periphery of the second spline part.

The second spline part may be inserted in the clearance between the main shaft and the first spline part so that the first spline teeth mesh with the second spline teeth.

In this manner, the second spline teeth are formed on the outer periphery of the cylindrical member. Compared to the case where the second spline teeth are formed on the inner periphery of the cylindrical member to form a clearance between the inner periphery of the cylindrical member and the outer periphery of the main shaft, the cylindrical member can be made thin (particularly, the second spline part). This reduces the external diameter of the hydraulic pump installed to the cylindrical member, thereby downsizing the hydraulic pump.

The clearance between the main shaft and the first spline part opens at an end on a side farther from the hub in the axial direction of the main shaft, and the second spline part may be inserted in the clearance from the side where the clearance is open.

In this manner, in such a case where an opening of the first spline part of the connecting member is disposed at the end on the side farther from the hub and the second spline part of the cylindrical member is inserted in the clearance between the main shaft and the first spline part from the opening of the first spline part, the cylindrical member and the hydraulic pump installed to the cylindrical member are located farther from the hub than the connecting member.

Therefore, the cylindrical member and the hydraulic pump having been installed to the cylindrical member can be removed from the main shaft by moving the cylindrical member in the axial direction opposite to the hub. In such a state that the connecting member is installed to the main shaft, the cylindrical member is moved to the hub side and the second spline part is inserted in the clearance so as to engage the first spline part with the second spline part.

Specifically, the hydraulic pump which requires frequent maintenance can be installed to and removed from the main shaft without removing the connecting member from the main shaft.

The fixing part of the connecting member may be fixed to the outer periphery of the main shaft by means of a plurality of pins which are provided a long a circumferential direction of the main shaft.

By fixing the fixing part of the connecting member is fixed to the main shaft by means of the pins, large torque can be transmitted to the connecting member.

The connecting member may be one of a cylindrically shaped member and a column shaped member having a diameter not greater than that of the main shaft and may include, but is not limited to, a fixing part which is fixed to other end of the main shaft that is on a side opposite to the one end coupled to the hub, and a first spline part which is formed with the first spline teeth on an outer periphery of the first spline part.

The cylindrical member may include, but is not limited to, a second spline part which is formed with the second spline teeth on an inner periphery of the second spline part.

In this manner, the connecting member having the external diameter not greater than the diameter of the main shaft is fixed to the end of the main shaft that is on the opposite side of the hub. Thus, the cylindrical member and the hydraulic pump installed to the cylindrical member can be removed from the main shaft by moving the cylindrical member in the axial direction opposite to the hub. Further, the second spline part of the cylindrical member and the first spline part can be engaged with each other by moving the cylindrical member toward the hub side in such a state that the connecting member is attached to the main shaft.

Specifically, the hydraulic pump which requires frequent maintenance can be installed to and removed from the main shaft without removing the connecting member from the main shaft.

Further, the fixing part of the connecting member may be fixed to the other end of the main shaft by means of: a plurality of pins which are provided on a joint surface of the fixing part and the other end of the main shaft along a circumferential direction of the main shaft; and a fastening member which penetrates the connecting member and extends in an axial direction of the main shaft.

In this manner, the pins are provided on the joint surface of the fixing part of the connecting member and the other end of the main shaft and thus, it is possible to firmly transmit large torque from the main shaft to the connecting member.

When rotation of the main shaft causes the torque to act on the pins, the force having a component force along the axial direction of the main shaft acts on the connecting member to push, the connecting member in the direction opposite to the hub by the pins. Therefore, it is possible to firmly fix the connecting member to the other end of the main shaft by providing the fastening member.

The joint surface may be formed into an uneven shape having projections projecting in the axial direction of the main shaft from the main shaft to the connecting member and depressions that are sunk in the axial direction from the connecting member to the main shaft. The projections and the depressions are alternately disposed in a circumferential direction of the main shaft.

The pins may be provided at borders between the projections and the depressions where a profile of the joint surface transits from the projection to the depression along a rotational direction of the main shaft.

In this manner, the pins are provided at the borders between the projections and the depressions so as to dispose, in the circumferential direction of the main shaft, a net force vector of surface pressures of the pins being pressed, against the main shaft or the connecting member, thereby reducing a circumferential component force in the circumferential direction of the main shaft. The circumferential component force acts to separate the main shaft and the connecting member.

The joint surface is formed into an uneven shape having the projections and the depressions that are alternately disposed in the circumferential direction of the main shaft and the projections and the depressions are fitted to one another. Thus, torque can be partially transmitted via the positions where the projections and the depressions are fitted. This can reduce torque loaded on the pins.

The power generating apparatus of renewable energy type may further include an annular holding plate which extends astride the connecting member and the cylindrical member and is installed at an end of the connecting member and the cylindrical member on a side farther from the hub to cover an engagement part of the first spline teeth and the second spline teeth. The cylindrical member may be prevented from slipping out with respect to the connecting member in the axial direction of the main shaft.

This prevents the cylindrical member and the hydraulic pump installed to the cylindrical member from slipping out.

The above power generating apparatus of renewable energy type may further include a pair of main shaft bearings which support the main shaft rotatably on a main body side of the power generating apparatus and the connecting member, the cylindrical member and the hydraulic pump may be arranged between the pair of main shaft bearings.

In this manner, the connecting member, the cylindrical member and the hydraulic pump are arranged between the pair of main shaft bearings so that the hydraulic pump which needs maintenance more often the main shaft bearings, can be removed and installed in a state that one of the pair of main shaft bearings that is closer to the hub is still attached to the main shaft. The removal and installation of the hydraulic pump use be performed in a short period of time with ease by saving the need to remove the one of the pair of the main shaft bearings that is closer to the hub.

The above power generating apparatus of renewable energy type may further include a pair of main shaft bearings which support use main shaft rotatably on a main body side of the power generating apparatus and the connecting member, the cylindrical member and the hydraulic pump may be arranged on a side farther from the hub than the pair of main shaft bearings.

In this manner, the connecting member, the cylindrical member and the hydraulic pump are arranged on the side farther from the hub than the pair of main shaft bearings so that the hydraulic pump which needs maintenance more often the main shaft bearings, can be removed and installed in a state that the pair of main shaft bearings are still attached to the main shaft. The removal and installation of the hydraulic pump can be performed in a short period of time with ease by saving the need to remove the pair of the main shaft bearings.

In the above power generating apparatus of renewable energy type, the power generating apparatus of renewable energy type may be a wind turbine generator in which the generator is driven by rotating the main shaft by wind acting on the blade.

Another aspect of the present invention is a method for installing a hydraulic pump for a power generating apparatus of renewable energy type which comprises a hub to which a blade is installed, a main shaft coupled to the hub, the hydraulic pump provided around the main shaft, a hydraulic motor driven by pressurized oil supplied from the hydraulic pump and a generator coupled to the hydraulic motor. The method of installing the hydraulic pump may include the steps of: fixing to the main shaft a connecting member which has first spline teeth and is constituted of a separate body from the main shaft; installing the hydraulic pump on an outer periphery of a cylindrical member which has second spline teeth meshing with the first spline teeth of the connecting member; and connecting the cylindrical member having been installed with the hydraulic pump on the outer periphery of the cylindrical member to the main shaft via the connecting member by meshing the first spline teeth of the connecting member with the second spline teeth of the cylindrical member.

According to the method for installing the hydraulic pump, the first spline teeth of the connecting member fixed to the main shaft, mesh with the second spline teeth of the cylindrical member to which the hydraulic pump is fixed. As a result, large torque can be transmitted from the main shaft to the hydraulic pump via connecting member and the cylindrical member.

The connecting member and the cylindrical member are constituted of separate bodies from the main shaft. Thus, the connecting member and the cylindrical member can be spline-processed with ease and at low cost. Further, the hydraulic pump is installed to the outer periphery of the hydraulic pump in advance and the cylindrical member is connected to the main shaft via the connecting member and thus, the hydraulic pump can be removed and installed easily with respect to the main shaft.

In the above method, the connecting member may include, but is not limited to, a fixing part which is fixed to an outer periphery of the main shaft, and a first spline part which has a clearance between the outer periphery of the main shaft and the first spline part. The first spline teeth are formed on an inner periphery of the first spline part facing the clearance.

Further, the cylindrical member may include, but is not limited to, a second spline part which is formed with the second spline teeth on a part of an outer periphery of the second spline part and in the step of connecting the cylindrical member to the main shaft, the second spline part may be inserted in the clearance between the main shaft and the first spline part so that the first spline teeth mesh with the second spline teeth.

In this manner, the second spline teeth are formed on the outer periphery of the cylindrical member. Compared to the case where the second spline teeth are formed on the inner periphery of the cylindrical member to form a clearance between the inner periphery of the cylindrical member and the outer periphery of the main shaft, the cylindrical member can be made thin (particularly, the second spline part). This reduces the external diameter of the hydraulic pump installed to the cylindrical member, thereby downsizing the hydraulic pump.

In the above method, the connecting member may be one of a cylindrically-shaped member and a column-shaped member having a diameter not greater than that of the main shaft and include, but is not limited to, a fixing part which is fixed to other end of the main shaft that is on a side opposite to the one end coupled to the hub, and a first spline part which is formed with the first spline teeth on an outer periphery of the first spline part. Further, the cylindrical member may include, but is not limited to, a second spline part which is formed with the second spline teeth on an inner periphery of the second spline part, and in the step of connecting the cylindrical member to the main shaft, the cylindrical member having been installed with the hydraulic pump on the outer periphery of the cylindrical member may be moved from the connecting member toward the main shaft in the axial direction of the main shaft so that the cylindrical member is fitted onto the connecting member to the main shaft to mesh the first spline teeth with the second spline teeth.

The connecting member is fixed to other end of the main shaft that is on a side opposite to the one end and has a diameter not greater than that of the main shaft. Thus, the cylindrical member and the hydraulic pump installed to the cylindrical member can be removed from, the main shaft by moving the cylindrical member in the axial direction opposite to the hub. In such a state that the connecting member is installed to the main shaft, the cylindrical member is moved to the nub side and the second spline part is inserted in the clearance so as to engage the first spline part with the second spline part. Specifically, the hydraulic pump which requires frequent maintenance can be installed to and removed from the main shaft without removing the connecting member from the main shaft.

Advantageous Effect of Invention

According to the present invention, it is possible to attain the fixation structure of the hydraulic, pump that can transmit large torque and be processed with ease and at low cost even when, the main shaft has a large diameter.

BRIEF DESCRIPTION OF DRAWINGS

FIG. 12 is a schematic cross-sectional view showing the hydraulic pump, the cylindrical member and the connecting member that are mounted to the outer periphery of the main shaft between the pair of main shaft bearings.

DESCRIPTION OF EMBODIMENTS

A preferred embodiment of the present invention will now be described in detail with reference to the accompanying drawings. In the preferred embodiment, the present invention is applied to a wind turbine generator. However, this is not limitative and the present invention may be applied to other power generating apparatuses of renewable energy type including a generator using tidal current, ocean current or river current.

It is intended that, unless particularly specified, dimensions, materials, shape, its relative positions and the like shall be interpreted as illustrative only and not limitative of the scope of the present invention.

Figure 1:
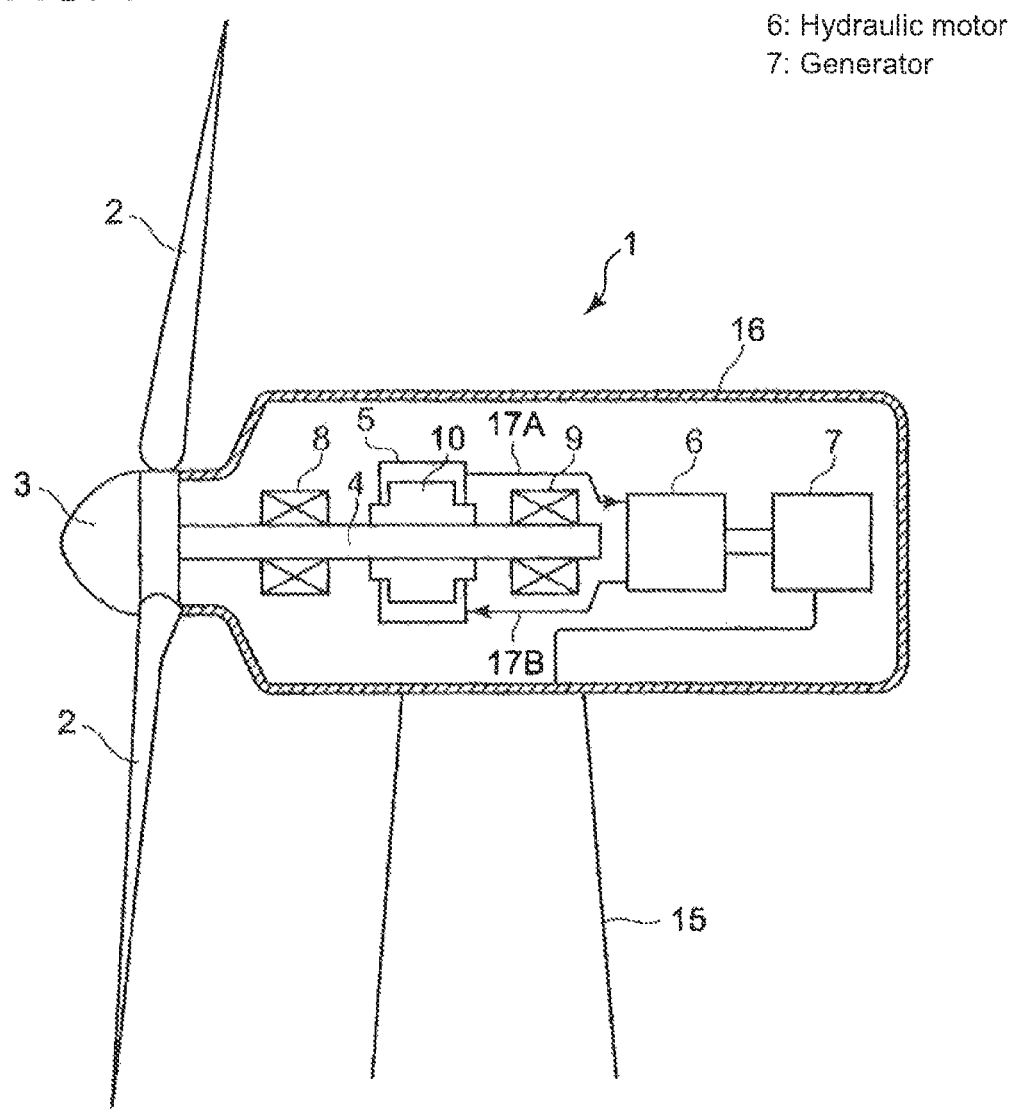
FIG. 1 is a schematic view showing a cross-section of a top part of a wind turbine generator in relation to a first preferred embodiment of the present invention.

FIG. 1 is a schematic view showing a cross-section of a top part of a wind turbine generator in relation to a first preferred embodiment of the present invention.

FIG. 1 shows a wind turbine generator 1 in relation to the preferred embodiment. The wind turbine generator 1 includes a hub 3 to which blades 2 are fixed, a main shaft 4 one end of which is fixed to the hub 3, a hydraulic pump 5 installed around the main shaft 4, a hydraulic motor 6 driven by pressurized oil from the hydraulic pump 5, and a generator 7 coupled to the hydraulic motor 6.

The main shaft 4, the hydraulic pump 5, the hydraulic motor 6 and the generator 7 are installed in a nacelle 16 mounted on a tower 15. The hydraulic pump 5 is arranged between a pair of main shaft bearings 8 and 9 that supports the main shaft rotatably on a side of the nacelle 16. The hydraulic pump 5 is installed to the main shaft 4 via a cylindrical member 10 provided on an outer periphery of the main shaft 4.

The hydraulic pump 5 is connected to the hydraulic motor 6 via a high-pressure oil passage 17A and a low-pressure oil passage 17B. The high-pressure oil passage 17A is provided between a discharge side of the hydraulic pump 5 and an intake side of the hydraulic motor 6 so that high-pressure oil produced in the hydraulic pump 5 streams therein. The low-pressure oil passage 17B is provided between a discharge side of the hydraulic motor 6 and an intake side of the hydraulic pump 5 so that low-pressure oil having been used in the hydraulic motor 6 streams therein.

Figure 2:
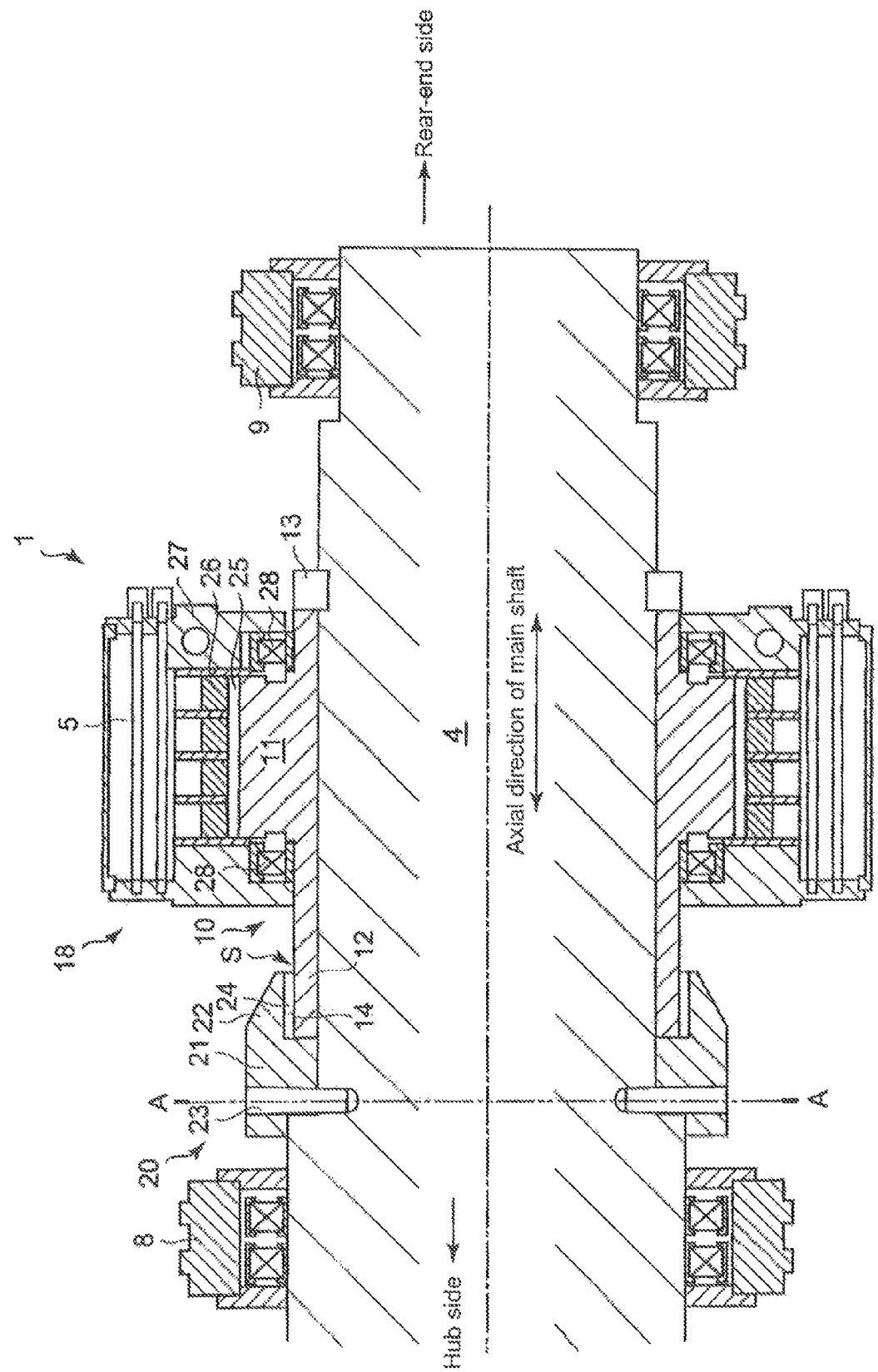
FIG. 2 is an enlarged view around a hydraulic pump installed to a main shaft.
Figure 3:
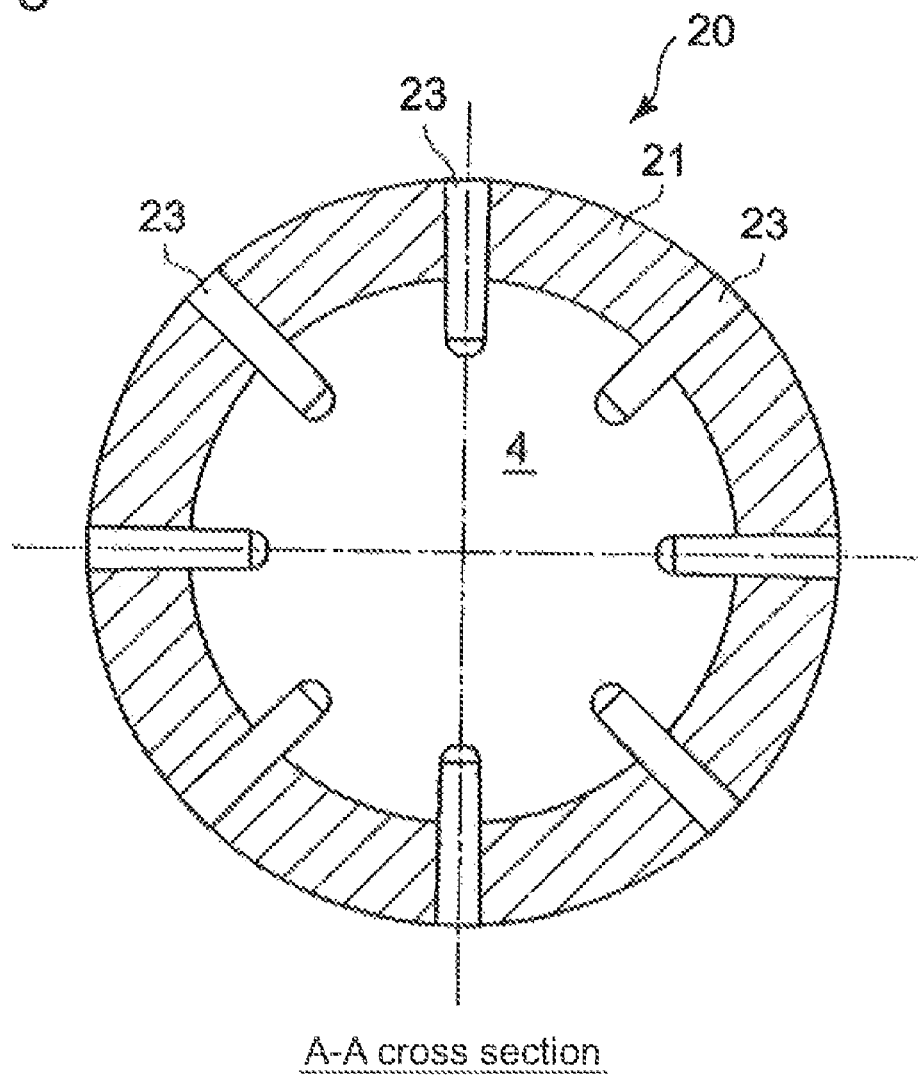
FIG. 3 is a cross-sectional view taken along the line A-A of FIG. 2.

FIG. 2 is an enlarged view around the hydraulic pump 5 installed to the main shaft 4. FIG. 3 is a cross-sectional view taken along the line A-A of FIG. 2.

FIG. 2 shows connecting members 20 provided on an outer periphery of the main shaft 4 such that the connecting members 20 engages with a cylindrical member 10 provided on the outer periphery of the main shaft 4.

The connecting member 20 is formed circularly around the main shaft 4 and is constituted of a fixing part 21 formed on one end and a first spline part 22 formed on other end.

As shown in FIG. 3, the fixing part 21 is fixed to the outer periphery of the main shaft 4 by means of a plurality of first pins 23 that are provided along a circumferential direction of the main shaft 4. The fixing part 21 of the connecting member 20 is fixed to the main shaft 4 by the first pins 23 and thus, it is possible to transmit large torque from the main shaft 4 to the connecting member 20.

The main shaft 4 has a stepped portion around the first pins 23 and the fixing part 21 and the fixing part 21 is also formed into a step-shape which corresponds with the stepped portion of main shaft 4. The stepped portion of the main shaft engages with the corresponding stepped portion of the fixing part 21 so as to restrain the movement of the connecting members 20 toward the hub side.

The fixing part 21 has a first spline part 22 that extends at an end that is on a side opposite to the hub 3 (hereinafter called "rear end"). The first spline part 22 and has a clearance S between the outer periphery of the main shaft 4 and the first spline part 22 and is formed with first spline teeth (internal teeth) 24. The clearance S opens at the end on the side opposite to the hub 3.

The cylindrical member 10 engages with the connecting member 20. The cylindrical member 10 includes a main body 11 and a second spline part 12.

A hydraulic pump 5 is installed to an outer periphery of the main body 11. On a rear-end side of the main body 11, an annular stopper 13 is provided so as to restrain the movement of the cylindrical member 10 toward the rear-end side. That is, the cylindrical member 10 is prevented from coming loose. The stopper 13 in combination with an engagement part of the stepped portions of the main shaft 4 and the fixing part 21, restrains the movement of the cylindrical member 10 in an axial direction of the main shaft 4. Therefore, the hydraulic pump 5 installed to the cylindrical member 10 does not move in the axial direction of the main shaft 4.

The second spline part 12 extending at the hub-side end of the main body 11. The second spline part 12 has second spline teeth (external teeth) 14 on the outer periphery of the second spline part 12.

The second spline part 12 is inserted in the clearance S so that the second spline teeth 14 mesh with the first spline teeth 24 of the first spline part 22. By meshing the second spline teeth 14 with the first spline teeth 24, the cylindrical member 10 and the main shaft are connected with each other via the connecting member 20.

In the fixation structure of the hydraulic pump 5 as described above, the hydraulic pump 5 is installed to the main shaft 4 in the manner below.

First, the connecting member 20 having the first spline teeth 24 is arranged on the outer periphery of the main shaft 4 and fixed to the main shaft 4 by means of the first pins 23. The main shaft bearing 8 of the pair of main shaft bearings 8 and 9 is arranged on the hub side. The main shaft bearing 8 is installed to the main shaft 4 before installing the connecting member 20 to the outer periphery of the main shaft 4.

Meanwhile, the hydraulic pump 5 is installed to the outer periphery of the cylindrical member 10 in advance to form a hydraulic pump unit 18 which is an integrated unit of the cylindrical member 10 and the hydraulic pump 5.

Next, the hydraulic pump unit 18 (the cylindrical member 10 and the hydraulic pump 5) is installed to the outer periphery of the main shaft 4 from the rear-end side of the main shaft 4. Then, the hydraulic pump unit 18 (the cylindrical member 10 and the hydraulic pump 5) is moved to the nub side to insert the second spline part 12 of the cylindrical member 10 in the clearance S and mesh the second spline teeth 14 with the first spline teeth 24.

Next, the stopper 13 is installed to the outer periphery of the main shaft 4 so as to prevent the hydraulic pump unit 18 (the cylindrical member 10 and the hydraulic pump 5) from coming loose.

Finally, the main shaft bearing 9 of the pair of main shaft bearings 8 and 9, which is to be installed on the rear-end side, is installed to the outer periphery of the main shaft 4.

FIG. 2 shows an exemplary structure of the hydraulic pump 5. The hydraulic pump 5 includes a ring cam 25 provided on the outer periphery of the main body 11 of the cylindrical member 10, pistons 26 that are actuated by the ring cam 25, a casing 27 that houses the ring cam 25 and the pistons 26, a pump bearings 28 provided between the casing 27, the cylindrical member 10 and many other components. The hydraulic pump 5 composed or may parts requires frequent maintenance compared to the main shaft bearings 8 and 9.

Therefore, the cylindrical member 10 and the hydraulic pump 5 are arranged between the pair of main shaft bearings 8 and 9 so that the hydraulic pump unit 18 including the hydraulic pump 5 can be installed and removed by simply removing the main shaft bearing 9 arranged on the rear-end side. Specifically, the hydraulic pump unit 18 can be installed removed without removing the main shaft bearing 8 and the connecting member 20.

Figure 4:
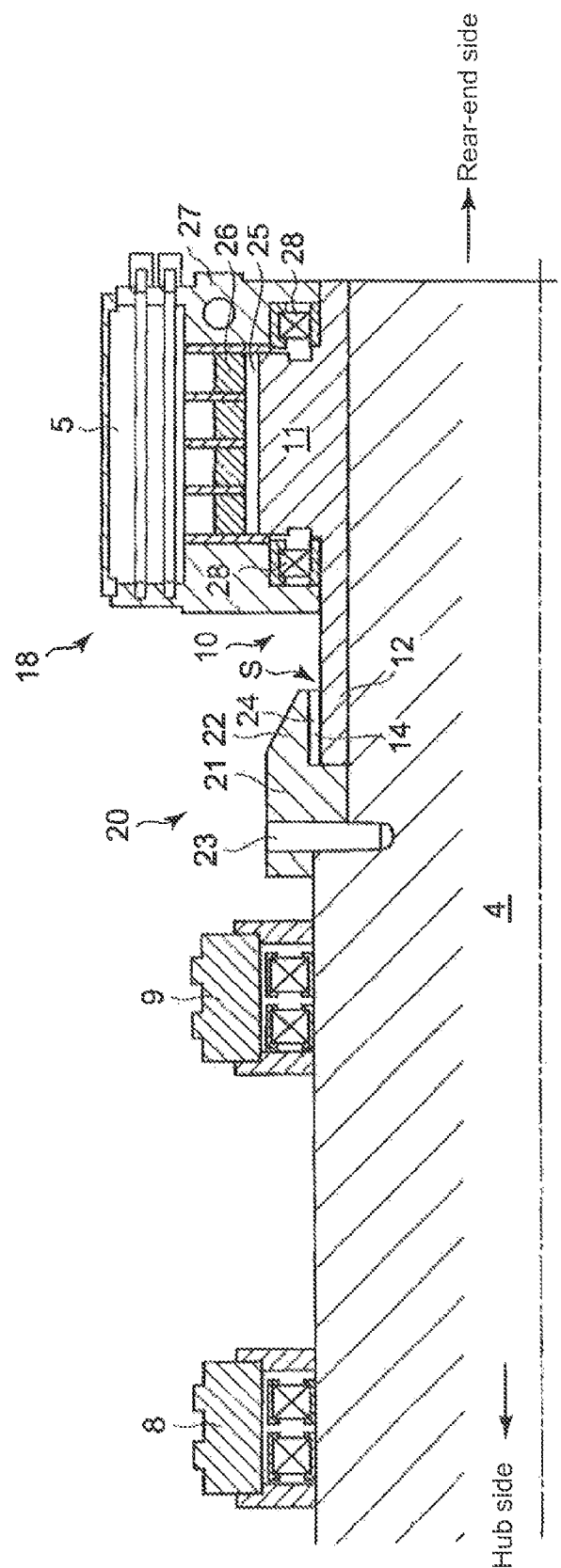
FIG. 4 is a schematic cross-sectional, view showing the hydraulic pump, a cylindrical member and a connecting member that are mounted to an outer periphery of the main shaft on a side closer to a rear end than a pair of main shaft bearings.

In the preferred embodiment, the hydraulic pump 5, the cylindrical member 10 and the connecting member 20 are arranged between the pair of main shaft bearings 8 and 9. However, this is not limitative and the hydraulic pump 5, the cylindrical member 10 and the connecting member 20 may be arranged at one end of the main shaft that on the rear-end side instead of the pair of main shaft bearings 8 and 9 as shown in FIG. 4. The same reference numerals are given in FIG. 4 without adding explanations for those configurations that are the same as FIG. 2.

In such case, the cylindrical member 10 and the hydraulic pump 5 are arranged closer to the rear-end side than the pair of main shaft bearings 8 and 9. Thus, the cylindrical, member 10 and the hydraulic pump 5 can be removed without removing the pair of main shaft bearings 8 and 9. By this, it is possible to facilitate and shorten the process of removing and installing the hydraulic pump unit 18 including the hydraulic pump 5, which requires frequent maintenance.

According to the wind turbine generator 1 as described above, the connecting member 20 is constituted of a separate body from the main shaft 4 so that large torque can be transmitted to the hydraulic pump 5 via the cylindrical member 10 even in the case where the main shaft 4 has a large diameter.

Further the connecting member 20 and the cylindrical member 10 are separate bodies from the main shaft 4. Thus, it is possible to spline the connecting member 20 and the cylindrical member 10 easily and at low cost.

The second spline teeth 14 are formed on the outer periphery of the cylindrical member 10. Compared to the case where the second spline teeth 14 are formed on the inner periphery of the cylindrical member 10 to form a clearance between the inner periphery of the cylindrical member 10 and the outer periphery of the main shaft 4, the second spline part 12 is thin. This reduces a height of the hydraulic pump 5 in a state of being installed to the cylindrical member 10.

The second spline part 12 is inserted in the clearance S from an opening of the rear-end side of the clearance S. Thus, it is possible to remove the hydraulic pump 5 from the main shaft 4 by moving the cylindrical member 10 having the second spline part 12 toward the rear-end side. After installing the cylindrical member 10 having been installed with the hydraulic pump 5 to the outer periphery of the main shaft 4 from the rear-end side, the cylindrical member is moved toward the hub side, thereby inserting the second spline part 12 in the clearance S to be engaged with the first spline teeth. Specifically, the hydraulic pump 5, which requires frequent maintenance, can be installed and removed from the main shaft 4 without removing the connecting member 20 and the main shaft 4.

A second preferred embodiment is explained. The same components as the first preferred embodiment are shown with the same reference numerals and not explained further. Mainly differences thereof are explained.

Figure 5:
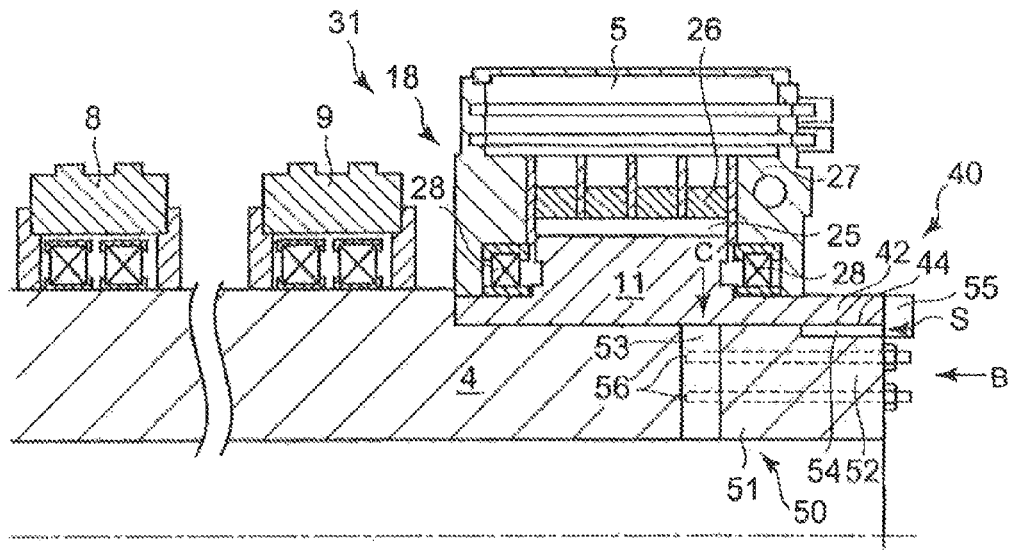
FIG. 5 is an enlarged view of a structure surrounding the hydraulic pump of the wind turbine generator in relation to a second preferred embodiment.
Figure 6:
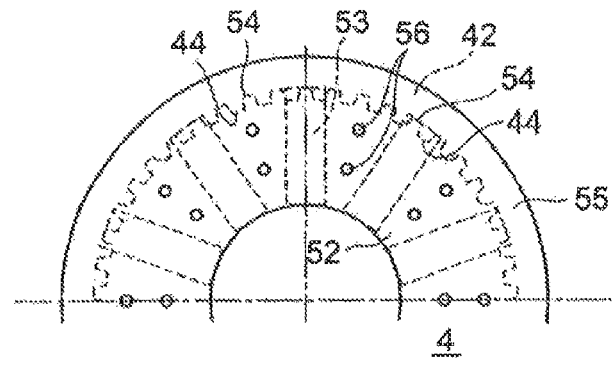
FIG. 6 is a fragmentary view from the arrow B of FIG. 5.

FIG. 5 is an enlarged view of a structure surrounding the hydraulic pump 5 of the wind turbine generator 1 in relation to the second preferred embodiment. FIG. 6 is a fragmentary view from the arrow B of FIG. 5. To make the description easy, the hydraulic pump 5 is not shown in FIG. 6.

As shown in FIG. 5 and FIG. 6, a wind turbine generator 31 in relation to the second preferred embodiment includes a cylindrical connecting member 50 provided at the end of the rear-end side of the main shaft 4, a cylindrical member 40 provided on the outer periphery of the connecting member 50 and the outer periphery of the cylindrical member 40 and the hydraulic pump 5 installed to the cylindrical member 40.

The cylindrical member 40 is constituted, of the main body 11 and a second spline part 42 having second spline teeth (internal teeth) 44 formed on the inner periphery of the second spline part 42.

The connecting member 50 is constituted of a first spline part 52 having first spline teeth (external teeth) 54 formed on the outer periphery of the first spline part 52 and a fixing part 51 which is fixed to the end e of the main shaft 4 that is on the rear-end side.

The first spline teeth 54 is arranged such as to mesh with the second spline teeth 44 of the cylindrical member 40. An annular holding plate 55 extends astride the connecting member 50 and the cylindrical member 40 on a side of the connecting member 50 that is on the rear-end side to cover an engagement part of the first spline teeth 54 and the second spline teeth 44. The holding plate 35 prevents the cylindrical member 40 from coming loose to the rear-end side.

The fixing part 51 of the connecting member 50 is, as shown in FIG. 5 and FIG. 6, fixed to the main shaft 4 by means of a plurality of fastening members 56 provided along the axial direction of the main shaft 4 and a plurality of second pins 53 provided along the circumferential direction of the main shaft 4.

The fastening members 56 are inserted, through the connecting member 50 and screwed to the end of the main shaft 4 that is on the rear-end side.

The second pins 53 are provided at a set interval on a joint surface of the fixing part 51 and the end of the main shaft 4 on the rear-end side in the circumferential direction of the main shaft 4.

The connecting member 50 of a cylindrical shape is preferably configured such that an external diameter of the connecting member 50 is not greater than a diameter of the main shaft 4. For instance, as shown in FIG. 5, the external diameter of the connecting member 50 may be the same as the diameter of the main shaft 4.

Figure 7:
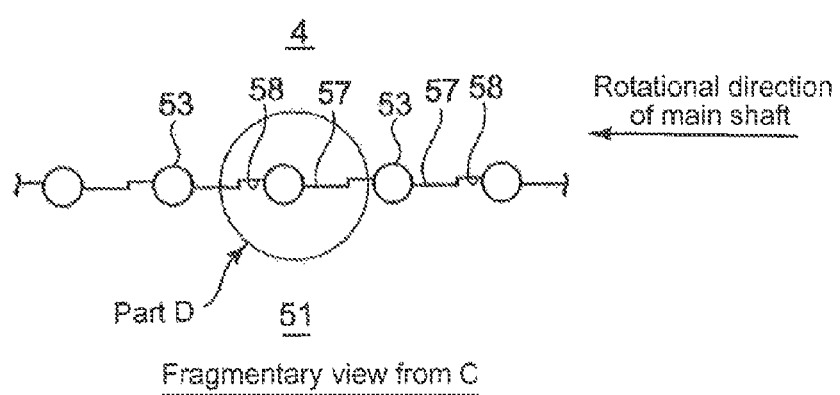
FIG. 7 is a fragmentary view from the arrow C of FIG. 5 and shows a joint surface of a fixing member and an end part of the main shaft on the rear end side.
Figure 8:
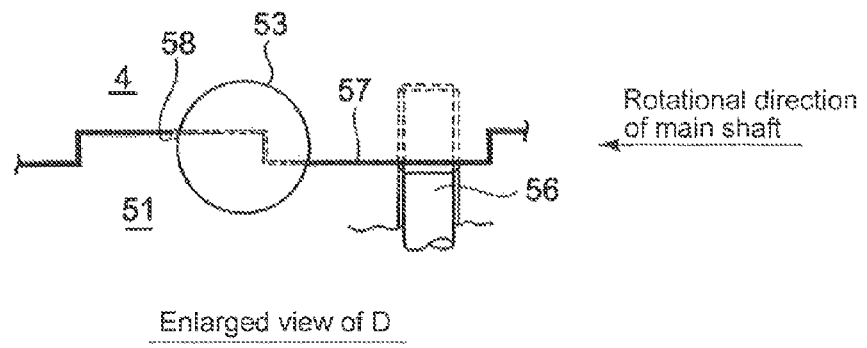
FIG. 8 is an enlarged view of the section D of FIG. 7.
Figure 9:
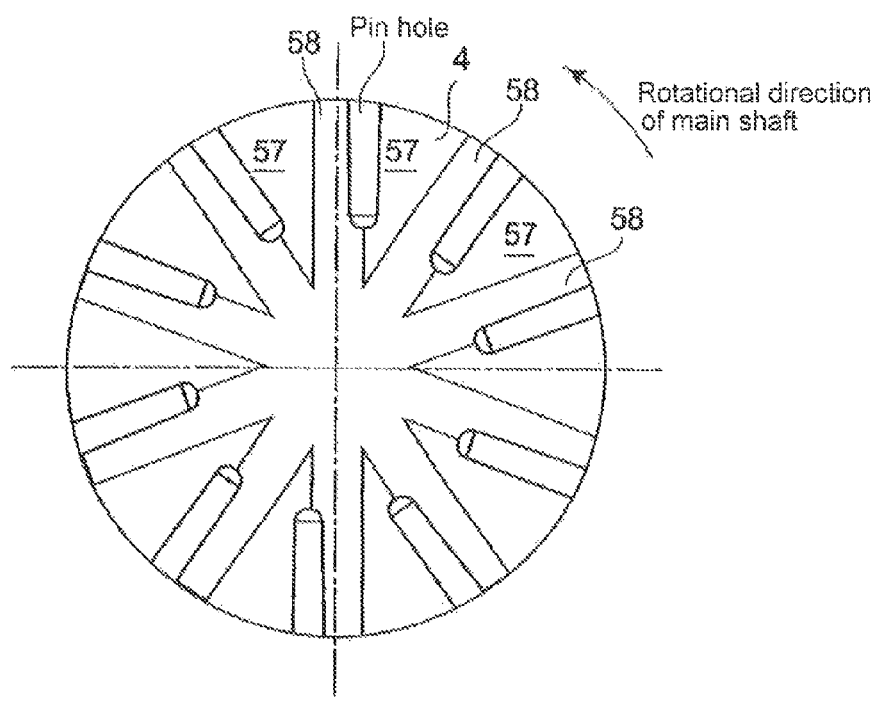
FIG. 9 is a fragmentary view of the joint surface of the main shaft from the rear.

FIG. 7 is a fragmentary view from the arrow C of FIG. 5 and shows the joint surface of the fixing member 51 and the end of the main shaft 4 on the rear-end side. FIG. 8 is an enlarged view of the section D of FIG. 7. FIG. 9 is a fragmentary view of the joint surface of the main shaft 4 from the rear side of the main shaft 4.

As shown in FIG. 7 to FIG. 9, the joint surface of the fixing part 51 and the end of the main shaft 4 on the rear-end side is formed into a uneven shape having projections 57 projecting in the axial direction of the main shaft 4 from the main shaft 4 to the connecting member 50 (in the vertical direction in FIG. 7 and FIG. 8) and depressions 58 that are sunk in the axial direction from the connecting member 50 to the main shaft 4. The projections and the depressions are alternately disposed in a circumferential direction of the main shaft 4.

The second pins 53 are provided at borders between the projections 57 and the depressions 58 where a profile of the joint surface transits from the projection 57 to the depression 58 along a rotational direction of the main shaft 4. There are advantages as explained below for arranging the second pins 53 on the borders between the projections 57 and the depressions 58.

Figure 10:
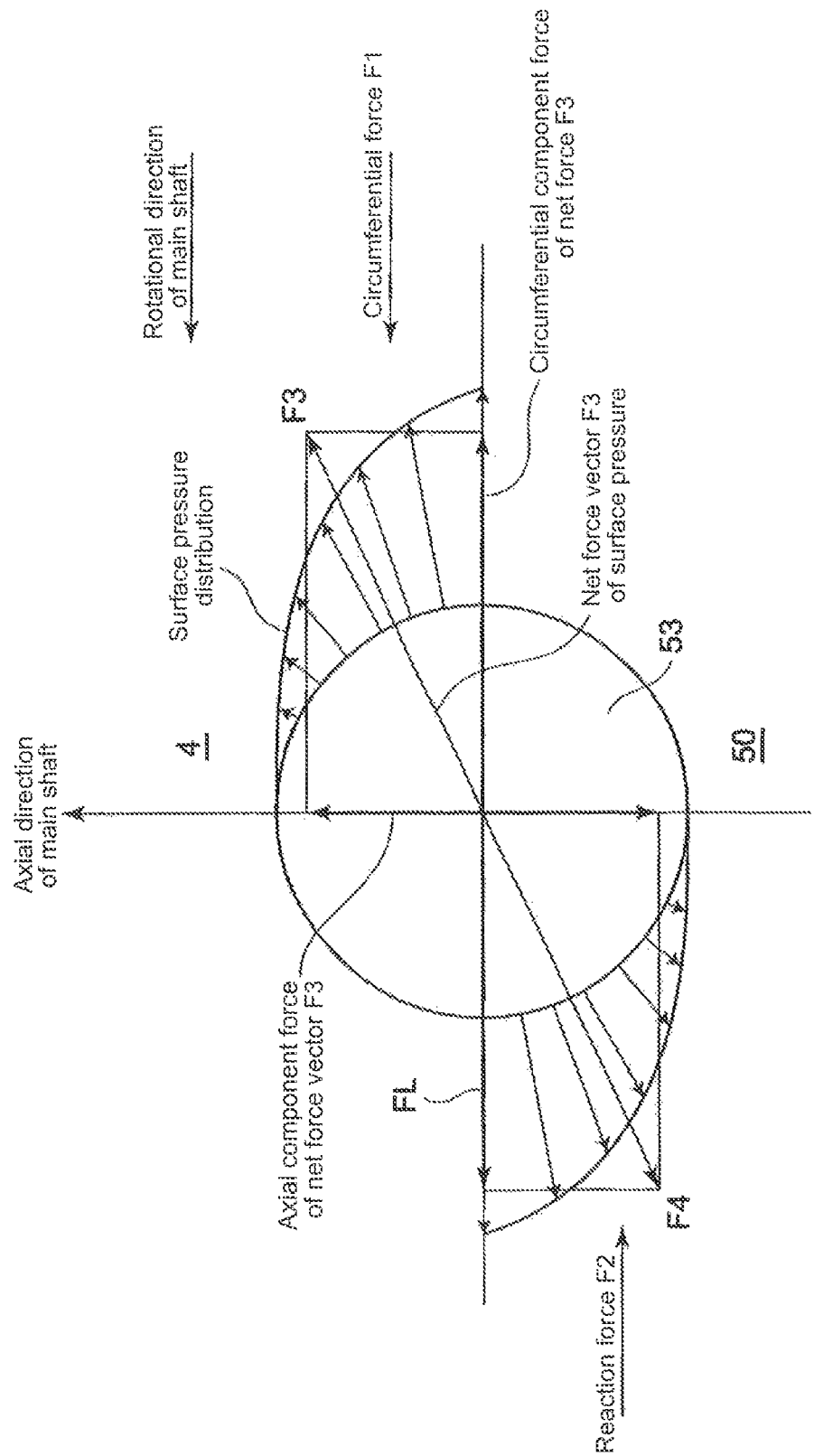
FIG. 10 is an illustration of surface pressure distribution of a second pin provided in a flat joint surface of the main shaft and the connecting member.
Figure 11:
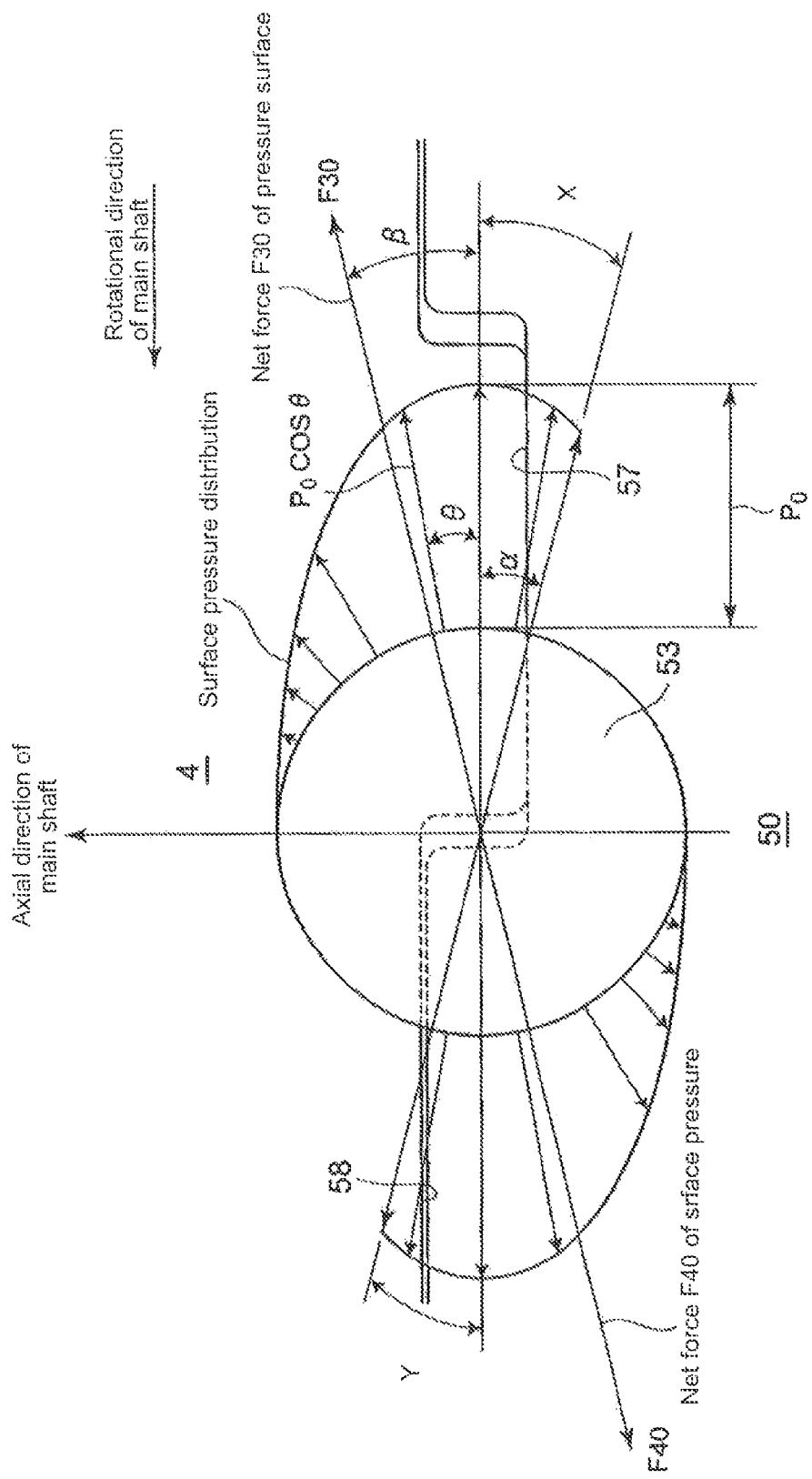
FIG. 11 is an illustration of surface pressure distribution of a second pin provided at a border between a projection and a depression along a rotational direction of the main shaft.

FIG. 10 is an illustration of surface pressure distribution of the second pins 53 provided in a flat joint surface of the main shaft 4 and the connecting member 50. FIG. 11 is an illustration of surface pressure distribution of the second pins 53 provided at borders between the projections 57 and the depressions 58 where a profile of the joint surface transits from the projection 57 to the depression 58 along the rotational direction of the main shaft 4.

As shown in FIG. 10, in the case where the joint surface FL is flat, the rotation of the main shaft 4 applies a force F1 to the second pin 53 in the circumferential direction of the main shaft 4. This generates surface pressure in a normal direction of the outer periphery of the second pin 53 to counteract the force F1. A net force vector F3 of the surface pressure is such that a component force in the circumferential direction of the main shaft 4 is balanced with the force F1, and pushes the main shaft 4 in such direction to move away from the connecting member 50 by the component force in the axial direction of the main shaft 4. A reaction force F2 from the connecting member 50 causes similar surface pressure. A net force vector F4 of such surface pressure is such that a component force in the circumferential direction of the main shaft 4 is balanced with the reaction force F2, and pushes the main shaft 4 in such direction to move away from the main shaft 4 by the component force in the axial direction of the main shaft 4.

As a result, the axial component of the net force vector F3 and the axial component of the net force vector F4 act to separate the main shaft 4 and the connecting member from each other. It is possible to join the main shaft 4 and the connecting member 50 together, for instance, by fixing the connecting member 50 to the main shaft 4 by means of the fastening members 56. However, this increases the number of fastening members 56.

FIG. 11 shows the case where the second pins 53 are provided on the uneven joint, surface at the borders between the projections 57 and the depressions 58. In such case, in addition to the surface pressure distribution of FIG. 10, surface pressures are generated in an area X and an area Y. The surface pressures in the area X are such that an axial component is a component force acting toward the connecting member 50. Thus, a net force vector F30 of the surface pressures inclines toward the circumferential direction of the main shaft 4 compared to the net force vector F3 (see FIG. 10). In other words, the axial component of the net force vector F30 is small compared to the net force vector F3. In a similar manner, the surface pressures in the area Y is such that an axial component is a component force acting toward the main shaft 4. Thus, a net force vector F40 of the surface pressures inclines toward the circumferential direction of the main shaft 4 compared to the net force vector F4 (see FIG. 10). In other words, the axial component of the net force vector F40 is small compared, to the net force vector F4.

Therefore, it is possible to reduce a force of the axial components acting in the direction to separate the main shaft 4 and the connecting member 50 from each other by providing the second pins 53 at the borders between the projections 57 and the depressions 58 on the joint surface and thus, it is possible to reduce the number of fastening members 56.

When an angle θ is $P_\theta \cos\theta$ as indicated in FIG. 11, an angle β of the net force vector F30 has a relationship shown below.

$$\beta = \tan^{-1}\frac{f(y)}{f(x)} \qquad \text{Formula (1)}$$

Herein, f(x) is a component force in the circumferential direction of the main shaft 4 and f(y) is a component force in the axial direction of the main shaft 4.

f(x) and f(y) have a relationship shown as Formula (2) and Formula (3).

$$f(x) = \int_{-d}^{\frac{\pi}{2}} P_0\cos^2\theta d\theta \qquad \text{Formula (2)}$$

$$f(y) = \int_{+d}^{\frac{\pi}{2}} P_0\cos\theta\sin\theta d\theta \qquad \text{Formula (3)}$$

According to the above formulas, for instance, when α is 0° (i.e. the case shown in FIG. 10), β is 32.5°; when α is 5°, β is 29.6°; and when α is 10°, β is 26.8°.

In the fixation structure of the hydraulic pump 5 as described above, the hydraulic pump 5 is installed to the main shaft 4 in the manner below.

First, the connecting member 50 is fixed to the end of the main shaft 4 on the rear-end side by means of the second pin 53 and the fastening members 56 (see FIG. 5). The pair of main shaft bearings 8 and 9 are installed to the outer periphery of the main shaft 4 in advance before fixing the connecting member 50 to the main shaft 4.

Meanwhile, the hydraulic pump 5 is installed to the outer periphery of the cylindrical member 40 in advance to form a hydraulic pump unit 18 which is an integrated unit of the cylindrical member 40 and the hydraulic pump 5.

Next, the hydraulic pump unit 18 (the cylindrical member 40 and the hydraulic pump 5) is installed to the outer periphery of the main shaft 4 from the rear-end side of the main shaft 4. In this process, the cylindrical member 40 is installed to the outer periphery of the main shaft 4 while meshing the second spline teeth 44 of the cylindrical member 40 with the first spline teeth 54 of the connecting member 50.

Finally, the holding plate 55 is installed to prevent the hydraulic pump unit 18 (the cylindrical member 40 and the hydraulic pump 5) from coming loose toward the rear-end side.

The hydraulic pump unit 18 (the cylindrical member 40 and the hydraulic pump 5) is arranged closer to the rear-end side than the pair of main shaft bearings 8 and 9 are. Thus, the hydraulic pump unit 18 can be removed and installed without removing the pair of main shaft bearings 8 and 9.

The external diameter of the connecting member 50 is not greater than the diameter of the main shaft 4 and thus, the pair of main shaft bearings 8 and 9 can be removed from or installed to the main shaft 4 in such a state that the connecting member 50 is attached to the main shaft 4. Therefore, it does not require to remove the connecting member 50 from the main shaft, when performing maintenance on the main shaft bearings 8 and 9.

In the preferred embodiment, the hydraulic pump 5, the cylindrical member 40 and the connecting member 50 are arranged closer to the rear-end side that the pair of main shaft bearings 8 and 9. However, this is not limitative and the hydraulic pump 5, the cylindrical member 40 and the connecting member 50 may be arranged between the pair of main shaft bearings 8 and 9 as illustrated in FIG. 12. The same reference numerals are given in FIG. 12 without adding explanations for those configurations that are the same as FIG. 5. In such case, the cylindrical member 40 and the hydraulic pump 5 are arranged between the pair of main shaft bearings 8 and 9 and thus, the cylindrical member and the hydraulic pump 5 can be removed by removing the pair of main shaft bearings 8 and 9.

According to the wind turbine generator 31 as described above, the connecting member 50 is constituted of a separate body from the main shaft 4 so that large torque can be transmitted to the hydraulic pump 5 via the cylindrical member 40 even in the case where the main shaft 4 has a large diameter.

Further the connecting member 50 and the cylindrical member 40 are separate bodies from the main shaft 4. Thus, it is possible to spline the connecting member 50 and the cylindrical member 40 easily and at low cost.

The connecting member 50 is fixed to the end of the main shaft 4 on the rear-end side and has a diameter not greater than that of the main shaft 4. Thus, the hydraulic pump 5 can be removed from the main shaft 4 by moving the cylindrical member 40 to the rear-end side. The cylindrical member 40 having been installed with the hydraulic pump 5 is installed to the outer periphery of main shaft 4 and the connecting member 50 to mesh the second spline teeth 44 of the cylindrical member 40 with the first spline teeth of the connecting member 50. Specifically, it is possible to remove and install the hydraulic pump 5 and the main shaft 4 which needs frequent maintenance, without removing the connecting member 50 from the main shaft 4.

The second pins 53 are provided on the joint surface between the connecting member 50 and the main shaft 4. Thus, it is possible to transmit large torque to the connecting member 50 and rotate the connecting member 50 integrally with the main shaft 4.

When rotation of the main shaft 4 causes the torque to act on the second pins 53, the force in the axial direction of the main shaft 4 acts via the second pins 53 at positions where true second pins 53 are pushed against the connecting member 50, i.e. positions where reaction force acts against the second pins 53 from the connecting member 50). This causes the second pins 53 to push the connecting member 50 outward, resulting in the connecting member 50 separating from the main shaft 4. This issue is not solved by providing the second pins alone. However, in the preferred embodiment, the fastening members 56 are provided as well so as to fix the connecting member 50 to the main shaft 4.

The second pins 53 are provided at borders between the projections 57 and the depressions 58 so as to dispose the positions in the axial direction of the main shaft 4, where the force acts on the second pins 53 from the main shaft 4 and the reaction force acts on the second pins 53 from the connecting member 50. By this, the axial force acting at the position where the second, pin 53 is pushed against the connecting member 50 can be tilted in the circumferential direction of the main shaft 4. This reduces the force acting in the axial direction of the main shaft 4, thereby reducing the force of the second pin 53 pushing the connecting member 50.

The joint surface is formed into an uneven shape having the projections 57 and the depressions 58 that are alternately disposed in the circumferential direction of the main shaft 4. The projections 57 and the depressions 58 are fitted to one another and thus, torque can be partially transmitted via the positions where the projections 57 and the depressions 58 are fitted. This can reduce torque acting on the second pins 53.

The annular holding plate 55 is provided so as to prevent the cylindrical member 40 from coming loose, thereby preventing the hydraulic pump 5 from coming loose.

In the above preferred embodiments, the wind turbine generators 1 and 31 are used as examples of the power generating apparatus of renewable energy type. However, this is not limitative and the present invention is applicable to many types of power generating apparatuses of renewable energy type other than the wind turbine generators 1 and 31.

For instance, the present invention may be applied to a generator which uses tidal current, ocean current or river current to generate power and in which the tower 15 is installed in the sea or water and tidal current, ocean current or river current acts on the blade 2 to rotate the main shaft 4.

REFERENCE SIGNS LIST

1 Wind turbine generator
2 Rotary blade
3 Hub
4 Main shaft
5 Hydraulic pump
6 Hydraulic motor
7 Generator
8 Main shaft bearing
9 Main shaft bearing
10 Cylindrical member
11 Main body
12 Second spline part
13 Stopper
14 Second spline teeth
15 Tower
16 Nacelle
17A HP oil passage
17B LP oil passage
18 Hydraulic pump unit
20 Connecting member
21 Fixing part
22 First spline part
23 First pin
24 First spline teeth
25 Ring cam 26 Piston
27 Casing
28 Pump bearing
31 Wind turbine generator
40 Cylindrical member
42 Second spline part
44 Second spline teeth
50 Connecting member
51 Fixing part
52 First spline part
53 Second pin
54 First spline
55 Holding plate
56 Fastening member
57 Projection
58 Depression
S Gap
FL Joint surface

The invention claimed is:

1. A power generating apparatus of renewable energy type comprising:
 a hub to which a blade is installed;
 a main shaft one end of which is coupled to the hub;
 a connecting member which has first spline teeth and is fixed to the main shaft, the connecting member being constituted of a separate body from the main shaft;
 a cylindrical member which has second spline teeth meshing with the first spline teeth of the connecting member and is provided around the main shaft;
 a hydraulic pump which is installed to the main shaft via the cylindrical member;
 a hydraulic motor which is driven by pressurized oil supplied from the hydraulic pump; and
 a generator which is coupled to the hydraulic motor,
 wherein the cylindrical member and the main shaft are connected with each other via the connecting member by meshing the first spline teeth of the connecting member with the second spline teeth of the cylindrical member.

2. The power generating apparatus of renewable energy type according to claim 1,
 wherein the connecting member comprises:
  a fixing part which is fixed to an outer periphery of the main shaft; and
  a first spline part which has a clearance between the outer periphery of the main shaft and the first spline part and is formed with the first spline teeth on an inner periphery facing the clearance,
 wherein the cylindrical member comprises:
  a second spline part which is formed with the second spline teeth on a part of an outer periphery of the second spline part, and
 wherein the second spline part is inserted in the clearance between the main shaft and the first spline part so that the first spline teeth mesh with the second spline teeth.

3. The power generating apparatus of renewable energy type according to claim 2,
 wherein the clearance between the main shaft and the first spline part is open at an end on a side farther from the hub in the axial direction of the main shaft, and
 wherein the second spline part is inserted in the clearance from the side where the clearance is open.

4. The power generating apparatus of renewable energy type according to claim 2,
 wherein the fixing part of the connecting member is fixed to the outer periphery of the main shaft by means of a plurality of pins which are provided along a circumferential direction of the main shaft.

5. The power generating apparatus of renewable energy type according to claim 1,
 wherein the connecting member is one of a cylindrically-shaped member and a column-shaped member having a diameter not greater than that of the main shaft and comprises:
  a fixing part which is fixed to other end of the main shaft that is on a side opposite to the one end coupled to the hub; and
  a first spline part which is formed with the first spline teeth on an outer periphery of the first spline part, and
 wherein the cylindrical member comprises:
  a second spline part which is formed with the second spline teeth on an inner periphery of the second spline part.

6. The power generating apparatus of renewable energy type according to claim 5,
 wherein the fixing part of the connecting member is fixed to the other end of the main shaft by means of: a plurality of pins which are provided on a joint surface of the fixing part and the other end of the main shaft along a circumferential direction cut the main shaft; and a fastening member which penetrates the connecting member and extends in an axial direction of the main shaft.

7. The power generating apparatus of renewable energy type according to claim 6,
 wherein the joint surface is formed into an uneven shape having projections projecting in the axial direction of the main shaft from the main shaft to the connecting member and depressions that are sunk in the axial direction from the connecting member to the main shaft, the projections and the depressions being alternately disposed in a circumferential direction of the main shaft, and
 wherein the plurality of pins are provided at borders between the projections and the depressions where a profile of the joint surface transits from the projection to the depression along a rotational direction of the main shaft.

8. The power generating apparatus of renewable energy type according to claim 5, further comprising:
 an annular holding plate which extends astride the connecting member and the cylindrical member and is installed at an end of the connecting member and the cylindrical member on a side farther from the hub to cover an engagement part of the first spline teeth and the second spline teeth,
 wherein the cylindrical member is prevented from slipping out with respect to the connecting member in the axial direction of the main shaft.

9. The power generating apparatus of renewable energy type according to claim 1, further comprising:
 a pair of main shaft bearings which support the main shaft rotatably on a main body side of the power generating apparatus,
 wherein the connecting member, the cylindrical member and the hydraulic pump are arranged between the pair of main shaft bearings.

10. The power generating apparatus of renewable energy type according to claim 1, further comprising:
 a pair of main shaft bearings which support the main shaft rotatably on a main body side of the power generating apparatus,
 wherein the connecting member, the cylindrical member and the hydraulic pump are arranged on a side farther from the hub than the pair of main shaft bearings.

11. The power generating apparatus of renewable energy type according to claim 1,
wherein the power generating apparatus of renewable energy type is a wind turbine generator in which the generator is driven by rotating the main shaft by wind acting on the blade.

12. A method for installing a hydraulic pump for a power generating apparatus of renewable energy type which comprises a hub to which a blade is installed, a main shaft coupled to the hub, the hydraulic pump provided around the main shaft, a hydraulic motor driven by pressurized oil supplied from the hydraulic pump and a generator coupled to the hydraulic motor, the method comprising the steps of:
  fixing to the main shaft a connecting member which has first spline teeth and is constituted of a separate body from the main shaft;
  installing the hydraulic pump on an outer periphery of a cylindrical member which has second spline teeth meshing with the first spline teeth of the connecting member; and
  connecting the cylindrical member having been installed with the hydraulic pump on the outer periphery of the cylindrical member to the main shaft via the connecting member by meshing the first spline teeth of the connecting member with the second spline teeth of the cylindrical member.

13. The method for installing the hydraulic pump for the power generating apparatus or renewable energy type according to claim 12,
  wherein the connecting member comprises:
    a fixing part which is fixed to an outer periphery of the main shaft; and
    a first spline part which has a clearance between the outer periphery of the main shaft and the first spline part, the first spline teeth being formed on an inner periphery of the first spline part facing the clearance,
  wherein the cylindrical member comprises:
    a second spline part which is formed with the second spline teeth on a part of an oater periphery of the second spline part, and
  wherein in the step of connecting the cylindrical member to the main shaft, the second spline part is inserted in the clearance between the main shaft and the first spline part so that the first spline teeth mesh with the second spline teeth.

14. The method for installing the hydraulic pump for the power generating apparatus of renewable energy type according to claim 12,
  wherein the connecting member is one of a cylindrically-shaped member and a column-shaped member having a diameter not greater than that of the main shaft and comprises:
    a fixing part which is fixed to other end of the main shaft that is on a side opposite to the one end coupled to the hub; and
    a first spline part which is formed with the first spline teeth on an outer periphery of the first spline part, and
  wherein the cylindrical member comprises:
    a second spline part which is formed with the second spline teeth on an inner periphery of the second spline part, and
  wherein in the step of connecting the cylindrical member to the main shaft, the cylindrical member having been installed with the hydraulic pump on the outer periphery of the cylindrical member is moved from the connecting member toward the main shaft in the axial direction of the main shaft so that the cylindrical member is fitted onto the connecting member to the main shaft to mesh the first spline teeth with the second spline teeth.

* * * * *